United States Patent Office 3,251,689

Patented May 17, 1966

3,251,689

MASKING FILM

Ehrhard Hellmig, Leverkusen, Germany, assignor to Agfa Aktiengesellschaft, Leverkusen, Germany, a corporation of Germany No Drawing. Filed Mar. 9, 1962, Ser. No. 178,541
Claims priority, application Germany, Mar. 14, 1961, A 36,970
6 Claims. (Cl. 96—9)

This invention relates to a process for the production of improved color reproductions and color-correcting masking films for the production of improved color reproductions and photographic materials for the production of such masking films. It is known that dyes used for subtractive color photographic images do not transmit all of the light which is required from theoretical considerations. The cyan dye, for example, which should absorb red light and transmit green and blue light, usually absorbs a small amount of green and blue light as well as the major portion of red light. The magenta dye, which should absorb green light and transmit blue and red light, usually absorbs a considerable amount of blue light and a small amount of red light, too. The yellow dye, which should absorb blue light and transmit green and red light, is usually satisfactory although sometimes it absorbs a small amount of red light. The result of printing a multicolor image formed of such dyes is to introduce unequal parts of all three records in each image which is made regardless of the color of light used in printing or the sensitivity of the printing material employed. Correction of the colors of printing is therefore desirable and this is usually done by masking.

It is known to improve the color in color separation records by producing at least two colored masks with actinic light, each from two regions of the visible spectrum, from the multicolor original to be reproduced, in a color which has its maximum transparency in the said two region of the spectrum. For the production of the color separation record these masks are brought into register with the colored original using the necessary color filters. In accordance with this process, it is possible to eliminate or at least substantially reduce the color falsifications of all three dyestuffs (yellow, magenta, cyan) caused by the so-called secondary densities of the component image dyestuffs that are used, if three color masks (a yellow mask, a magenta mask and a cyan mask) are used. The three color masks are preferably produced by chromogenic development on a common support in three light-sensitive layers applied one above the other so that the use of the process is facilitated and accelerated.

However, such a masking film shows a number of disadvantages related with the production, the sensitometric testing, the rapidity of the processing and the reliability in practical use. Firstly this masking process requires a material having at least three different layers or considering the necessary yellow film layer, four layers.

This means that a relatively large number of processing steps are required during its manufacture. Furthermore, the color matching of the three layers as regards gradation and sensitivity presents considerable difficulties and results in the production of a large amount of rejected material during production. On account of such variables in production, the properties of the film materials are subject to relatively large variations which lead to bad results in the subsequent processing of the film by the consumer and cause variations in processing.

The sensitometric testing of the three-layer material is substantially more difficult than that of three-layer color films on account of the individual sensitisation that is required of separate layers. It is exceedingly difficult to control the sensitivities of the individual layers. The same circumstance also makes is difficult for the consumer to judge a masking image produced with the material, so that the reliability of the process in practical use is impaired and defective results expected to be accepted.

It is among the objects of the present invention to avoid the disadvantages described about and to provide a masking film having a simple structure or composition which permits the production of excellent color reproductions without complicated or complex processing.

The freezing objects are attained by means of a two-layer material comprising one layer which is sensitive to red and blue actinic light containing a coupler which absorbs in the green (magenta coupler) and the red (cyan coupler) regions of the visible spectrum. In the coupling reaction a blue-violet dye is formed which transmits light of the blue region of the spectrum. This dye can be produced from a single color coupler or from a mixture of one of the known magenta and cyan couplers by color-forming development. In this connection it is to be understood that a blue violet dye transmits blue light up to approximately 500 mμ. The second layer is sensitive to the green and red regions of the visible spectrum and is provided with a yellow coupler in admixture with a cyan coupler or a single greenish-yellow coupler so that a greenish-yellow image is formed in this layer on processing.

The gradation of the film according to the invention in the processed state is between 0.2 and 1.0, advantageously about 0.5. The gradation of the material in the three regions of the spectrum does not have to be the same, but can be different according to the required strength of the masking.

The spectral sensitivities of the single layers do not have to be the same in both regions of the visible spectrum. For example, it is advantageous for the red sensitivity of the blue-red-sensitive layer to be higher than its sensitivity to blue, and the green sensitivity of the green-red-sensitive layer to be higher than its sensitivity to red. The ratio between the two sensitivities depends on the strength of the images of the secondary color densities which are to be excluded by the masking, and thus is dependent on the inks (printing inks) used for the reproduction and the image colors of the original to be reproduced. The ratio of these sensitivities may be as high as 10:1 but is preferably between 4:1 and 5:1. The layers are arranged so that the layer sensitive to blue and red faces the light source and thus is the uppermost layer.

In order to reduce the blue sensitivity of the layer sensitive to blue and red, this layer can be dyed in known manner with a dyestuff which absorbs blue light, such as tartrazine, pan yellow or aziline orange, CI 16230; this dyeing simultaneously acts as yellow filter for the subjacent layer. By means of this step, a separate yellow filter layer becomes superfluous, so that the material according to the invention constitutes to a two-layer material. Obviously, the lowermost layer can be dyed similarly with a dyestuff which absorbs blue light, advantageously the same dyestuff as in the upper layer, in order to eliminate any blue sensitivity which still exists or for avoiding a diffusion of dyestuff from the upper layer.

Instead of the two light-sensitive layers being disposed directly one above the other, as mentioned, the two layers can be arranged on two sides of the support. This advantageous, in that each layer can be separately controlled if the other is removed by scratching. It is thus possible to achieve a satisfactory sensitometric control during production and also a checking during processing. Processing errors, such as defective exposure of one layer, deviation from the gradation position and the like can be immediately observed. The reliability and quality of the reproductions is thereby improved.

In this way, the processer is provided with the additional important advantage that the two-layer material renders possible a faster processing, for example, by easier removal of the image silver upon color-forming development and bleaching, especially when the two light-sensitive layers are arranged on opposite sides of the support, i.e., as separate layers.

The material produced according to the process of the present invention can also be provided with one of the known antihalation layers, which is disposed either on the back of the support or the back of the rear emulsion layer. Similarly, means can be provided in a manner known per se which lead to a mask which is not sharp, such as light-diffusing agents, which are added to one or both emulsion layers or to the antihalation layer or are applied in the form of a separate diffusing layer, preferably on the back of the film, and which are dissolved out or bleached in the processing baths.

Despite its simple structure, the material produced according to the process of the present invention provides a complete masking. The film does in fact contain the following separate masks:

(1) Upper layer:
- (a) Red-sensitive mask, dyed magneta,
- (b) Red-sensitive mask, dyed cyan,
- (c) Blue-sensitive mask, dyed magenta,
- (d) Blue-sensitive mask, dyed cyan.

(2) Lower layer:
- (a) Green-sensitive mask, dyed yellow,
- (b) Green-sensitive mask, dyed cyan,
- (c) Red-sensitive mask, dyed yellow,
- (d) Red-sensitive mask, dyed cyan.

Since the cyan-dyed, red-sensitive mask appears twice (1*b* and 2*d*), the two-layer material according to the invention contains all together 7 separate masks; these include all possible 6 "true" masks (i.e., those marks which effect a color correction) and a "non-true" contrast-reducing mask.

If contrast corrections or also other similar corrections (for example, the avoidance of over-masking) are necessary in the other regions of the spectrum, the sensitivity extending over two regions of the spectrum can also be extended to a corresponding degree to the third region of the spectrum.

*Example 1*

A transparent support of a polycarbonate of a bis(hydroxyphenyl)alkane having a thickness of 0.1 mm. which is provided on either side with a subbing layer is coated on one side with a yellow filter layer consisting of a suspension of colloidal silver in gelatin as binding agent. The density of this filter is 0.9 measured with a blue filter. The filter layer is overcoated with a silver halide gelatin layer having a thickness of 4.5 microns, the silver halide of which is substantially silver bromide. Said layer is additionally sensitized against light of the red region of the visible spectrum. The total sensibility of the layer is relatively low, approximately 10° DIN. The layer also contains, per kg. of emulsion, 1.6 g. of tartrazine, 4.45 g. of the magenta coupler Z169, which is the sodium salt of 1-(3-sulfo-4-phenoxylphenyl)-3-heptadecyl-5-pyrazolone, and 12 g. of the cyan coupler F546 which is N-octadecyl-4-sulfo-1-hydroxy-2-naphthamide.

The opposite side of the support is coated with a layer of the same emulsion having the same thickness of 4.5 microns. This layer, however, is sensitized to the red and the green regions of the visible spectrum. Furthermore the color couplers described above are replaced with 15 g. of the yellow coupler F535 which is 4'-octadecoylamino) benzoyl-3,5-dicarboxyacetanilide and 5.4 g. of the cyan coupler F654 which is the sodium salt of N-2-(N-methylamide. The last mentioned layer contains no tartrazine. The light-sensitive layers are provided with protective gelatin layers containing a delustering agent in order to prevent the formation of Newton rings.

The two-layer material described hereinbefore is exposed through the multicolor original to be reproduced (multicolor transparency) whereby the blue and red-sensitive emulsion layer is in contact to the back of said original. The exposed material is developed for 3 minutes at 20° C. with the following developer:

| | | |
|---|---|---|
| N,N-diethyl phenylenediamine | g. | 5 |
| Hydroxylamine hydrochloride | g. | 2 |
| Anhydrous sodium sulfite | g. | 3.5 |
| Anhydrous sodium carbonate | g. | 60 |
| Potassium bromide | g. | 1.5 |
| Water | ml. | 1000 |

The exposed material is washed for 2 minutes and thereafter treated for 3 minutes in a bleach-fixing bath having the following composition:

| | | |
|---|---|---|
| Ferric salt of mono sodium ethylene diamine tetra acetic acid | g. | 40 |
| Tri-sodium ethylene diamine tetra acetic acid | g. | 15 |
| Anhydrous sodium thiosulfate | g. | 120 |
| Sodium sulfate | g. | 12 |
| Thiourea | g. | 6 |
| Water | ml. | 1000 |

Thereafter the masking image is washed again for 5 minutes and finally dried.

The resulting colored mask is brought into register with the original to be reproduced and fixed at the back of said original. This combination represents the original for the production of the color separation records which is accomplished in a manner well known by means of the usual color separation filters.

The resulting color separation records and the final print are of high quality with respect to their color values.

*Example 2*

From the original multicolor transparency is firstly produced a black-white, high-light mask by means of a blue sensitive black-white film having a steep gradation. Said high-light mask capable of correcting the light areas of the original has at the areas of highest density the blackening of about 0.5.

The original and the high-light mask is brought into register and the color correcting mask is produced as described in Example 1 from said combination.

Thereafter the original is brought into register with the color correcting mask as described in Example 1. A color negative film is exposed through the last mentioned combination using an enlarging apparatus so as to produce an enlarged negative color corrected copy of said original. The exposed negative material is processed in a manner well known. The negative copy can be used for the production of color corrected copies or photographic enlargements using multicolor paper or multicolor film.

It will be immediately understood that the process of the present invention can also be performed with separate layers which are each on a support, these layers either being sensitive to the same regions of the spectrum as the previously described two-layer material, or being sensitive over the entire visible spectrum, and in this case, the exposure is carried out with color filters of corresponding spectral transparency.

Generally the recording power of each of these single layers is restricted to two regions of the visible spectrum by exposing in known manner with the light of two regions of the visible spectrum while keeping said layers in printing relation to the multicolor image to be reproduced. Suitable filters for this purpose are yellow, magenta and cyan color filters, that is to say, subtractive color filters which transmit light of two regions of the visible spectrum. It is also possible to expose each layer twice behind two different additive color filters.

The contrast reducing mask can be obtained in these layers by an additional exposure with light of the third region of the visible spectrum. In the latter case the subtractive color filters with a predominant transparency in two regions of the spectrum and the reduced transparency in the third region of the spectrum can be used whereby the transparency in that third region of the spectrum is adapted to the desired reduction in contrast. The highest and lowest color density of these filters should differ in the three spectral regions by a factor of less than 2.

In principle, all the individual embodiments described in German Patent No. 1,069,471 can be used on the present material. Moreover, the dyeing of the masks can be effected by a process other than the color-forming development which has been described by way of example. Furthermore, the masks of the present invention can be combined in known manner with at least one tone value mask, which can also be arranged in a separate layer.

The process of the invention is not limited to the production of color separation records for use in the reproduction art; the color original combined with the mask of the present invention can also be used for the production of colored copies in the colored negative-positive process or also in color reversal processes by the contact method or by the optical method. In this way, there are obtained color copies (on film or paper) with improved colors or second images (duplicates).

Having thus described my invention I now state that I believe my invention to be capable of numerous variations in method, apparatus and materials. For example suitable supporting layers or sheets for the masking film of the present invention can be formed of any transparent polymeric material such as cellulose esters, polycarbonates, particularly polycarbonates of bis(hydroxy-phenyl (alkanes, and polyesters of ethylene glycol and terephthalic acid and the like. Although gelatin is a preferred binding agent for the light-sensitive layer, other water-permeable binding agents can be used, for example, carboxy methyl cellulose, polyvinyl alcohols, alginates and the like.

I claim:

1. A light-sensitive photographic material which consists essentially of
   (i) a transparent supporting layer,
   (ii) a silver halide emulsion layer sensitive to the blue and red regions of the visible spectrum which the red and blue regions of the visible spectrum, and contains two color couplers which form upon reaction with the oxidation products of a primary aromatic amine developer a cyan and amagenta dye and absorbs light of the green and red regions of the visible spectrum,
   (iii) a silver halide emulsion layer sensitive to the red and green regions of the visible spectrum which contains two color couplers which form upon reaction with the oxidation products of a primary aromatic amine developer a yellow and a cyan dye and absorbs light of the red and blue regions of the visible spectrum, and
   (iv) a yellow-colored filter layer that absorbs light of the blue region of the visible spectrum that is interposed between the two emulsion layers that are each sensitive to different regions of the visible spectrum.

2. A light-sensitive photographic material as defined in claim 1 in which the silver halide emulsion layers are arranged on opposite sides of the transparent supporting layer.

3. A light-sensitive photographic material as defined in claim 1 in which the silver halide emulsion layer that is sensitive to the blue and red regions of the visible spectrum is up to 10 times as sensitive to red light as it is to blue light.

4. A light-sensitive photographic material as defined in claim 1 in which the silver halide emulsion layer that is sensitive to the red and green regions of the visible spectrum is up to 10 times as sensitive to green light as it is to red light.

5. A process for the production of a color-correcting mask from an original multicolor image that is composed of yellow, magenta, and cyan partial images which comprises
   (a) exposing a light-sensitive photographic material to the original multicolor image, which light-sensitive photographic material consists essentially of the following elements:
      (i) a transparent supporting layer,
      (ii) a silver halide emulsion layer sensitive to the blue and red regions of the visible spectrum which contains two color couplers which form upon reaction with the oxidation products of a primary aromatic amine developer a cyan and a magenta dye and which absorbs light of the red and green regions of the visible spectrum,
      (iii) a silver halide emulsion layer sensitive to the red and green regions of the visible spectrum which contains two color couplers which form upon reaction with the oxidation products of a primary aromatic amine developer a yellow and a cyan dye which absorbs light of the blue and red regions of the visible spectrum, and
      (iv) at least one of which layers is also a yellow colored filter that absorbs light of the blue region of the visible spectrum,
      the respective layers of which are superimposed upon each other in such order that the light which reaches the layer that is sensitive to the red and green regions of the visible spectrum (iii) during the exposure has passed through the layer that is sensitive to the blue and red regions of the visible spectrum (ii),
   (b) developing the exposed light-sensitive photographic material with a developing composition that contains a primary aromatic amine developer, and
   (c) subsequently bleaching and fixing the thus developed photographic material, thereby completing the production of the color-correcting mask.

6. A process for the production of a color-correcting mask from an original multicolor image that is composed of yellow, magenta, and cyan partial images which comprises
   (a) exposing a light-sensitive photographic material to the original multicolor image, which light-sensitive photographic material consists essentially of the following elements:
      (i) a transparent supporting layer,
      (ii) a silver halide emulsion layer sensitive to the blue and red regions of the visible spectrum which contains two color couplers which form upon reaction with the oxidation products of a primary aromatic amine developer a cyan and a magenta dye and which absorbs light of the red and green regions of the visible spectrum,
      (iii) a silver halide emulsion layer sensitive to the red and green regions of the visible spectrum which contains two color couplers which form upon reaction with the oxidation products of a primary aromatic amine developer a yellow and a cyan dye which absorbs light of the blue and red regions of the visible spectrum, and
      (iv) a yellow-colored filter layer that absorbs light of the blue region of the visible spectrum that is interposed between the two emulsion layers that are each sensitive to different regions of the visible spectrum, (b) developing the exposed light-sensitive photographic material with a developing composition that contains a primary aromatic amine developer, and (c) subsequently bleaching and fixing the thus developed photographic material, thereby completing the production of the color-correcting mask.

References Cited by the Examiner

UNITED STATES PATENTS

| | | | |
|---|---|---|---|
| 2,592,514 | 4/1952 | Harsh | 96—74 |
| 2,647,833 | 8/1953 | Harrison et al. | 96—74 |
| 2,694,008 | 11/1954 | Berger et al. | 96—3 |
| 2,697,662 | 12/1954 | McQueen et al. | 96—9 |

FOREIGN PATENTS

| | | |
|---|---|---|
| 501,190 | 2/1939 | Great Britain. |
| 543,606 | 3/1942 | Great Britain. |
| 562,854 | 7/1944 | Great Britain. |
| 568,440 | 4/1945 | Great Britain. |
| 755,458 | 8/1956 | Great Britain. |
| 811,311 | 4/1959 | Great Britain. |

NORMAN G. TORCHIN, *Primary Examiner.*

J. T. BROWN, *Assistant Examiner.*

UNITED STATES PATENT OFFICE

CERTIFICATE OF CORRECTION

Patent No. 3,251,689 May 17, 1966

Ehrhard Hellmig

It is hereby certified that error appears in the above numbered patent requiring correction and that the said Letters Patent should read as corrected below.

Column 2, line 2, for "is" read -- it --; line 8, for "about" read -- above --; line 12, for "freezing" read -- foregoing --; line 55, for "aziline" read -- azilane --; same column 2, line 67, after "This" insert -- is --; column 3, line 27, for "magneta" read -- magenta --; line 41, for "marks" read -- masks --; line 75, after "-methyl-" insert -- N-octadecylamino)-4-sulfophenyl-1-hydroxy-2-naphth- --; column 5, line 51, strike out "the red and blue regions of the visible spectrum, and".

Signed and sealed this 1st day of August 1967.

(SEAL)
Attest:

EDWARD M. FLETCHER, JR.
Attesting Officer

EDWARD J. BRENNER
Commissioner of Patents